United States Patent
Wang et al.

(10) Patent No.: US 10,871,463 B2
(45) Date of Patent: Dec. 22, 2020

(54) PREPARATION METHOD BASED ON SIMULTANEOUS PACKAGE OF TARGET SUBSTANCE AND SYNTHESIS OF MOFS WITH REDOX ACTIVITY

(71) Applicant: QINGDAO UNIVERSITY, Shandong (CN)

(72) Inventors: Zonghua Wang, Qingdao (CN); Gege Yu, Qingdao (CN); Jianfei Xia, Qingdao (CN); Shida Gong, Qingdao (CN)

(73) Assignee: QINGDAO UNIVERSITY, Shandong (CN)

( * ) Notice: Subject to any disclaimer, the term of this patent is extended or adjusted under 35 U.S.C. 154(b) by 92 days.

(21) Appl. No.: 15/771,327

(22) PCT Filed: Jul. 17, 2017

(86) PCT No.: PCT/CN2017/093150
§ 371 (c)(1),
(2) Date: Apr. 26, 2018

(87) PCT Pub. No.: WO2018/045824
PCT Pub. Date: Mar. 15, 2018

(65) Prior Publication Data
US 2018/0305379 A1 Oct. 25, 2018

(30) Foreign Application Priority Data
Sep. 12, 2016 (CN) .......................... 2016 1 0819282

(51) Int. Cl.
*G01N 27/327* (2006.01)
*G01N 27/30* (2006.01)
(Continued)

(52) U.S. Cl.
CPC .......... *G01N 27/3278* (2013.01); *C07F 3/06* (2013.01); *G01N 27/30* (2013.01); *G01N 27/327* (2013.01); *G01N 27/48* (2013.01)

(58) Field of Classification Search
CPC .. G01N 27/3278; G01N 27/327; G01N 27/48; G01N 27/30; C07F 3/06; C07F 3/003
See application file for complete search history.

(56) References Cited

FOREIGN PATENT DOCUMENTS

| CN | 102288669 A | 12/2011 |
|---|---|---|
| CN | 103694260 A | 4/2014 |

(Continued)

OTHER PUBLICATIONS

J. Yang, et al. "A Novel CuxO Nanaparticle@ZIF-8 Composite Derived from Core-Shell Metal-Organic Frameworks for Highly Selective Electrochemical Sensing of Hydrogen Peroxide", ACS Applied Materials & Interfaces, 8(31): p. 20407-20414 +S1-S7, July (Year: 2016).*

(Continued)

*Primary Examiner* — J. Christopher Ball
(74) *Attorney, Agent, or Firm* — Oliff PLC

(57) ABSTRACT

A preparation method based on simultaneous package of a target substance and synthesis of MOFs with redox activity, wherein methylene blue is selected as an organic target molecule, the methylene blue is packaged in the MOFs when the MOFs are synthesized by using a one-pot method to obtain ZIF-8 modified by the methylene blue. The drawback that above-mentioned MOFs material does not have electrical conductivity is overcome, the method is simple, rapid and low in cost, and the prepared product can accurately, sensitively, simply and quickly detect dopamine, and a new development direction is provided for researches in the fields of biological detection and chemical analysis, etc.

1 Claim, 3 Drawing Sheets

(51) Int. Cl.
*C07F 3/06* (2006.01)
*G01N 27/48* (2006.01)

(56) References Cited

FOREIGN PATENT DOCUMENTS

| CN | 103920158 A | 7/2014 | | |
|---|---|---|---|---|
| CN | 104087572 A | 10/2014 | | |
| CN | 106518895 A | 3/2017 | | |
| WO | 2009/093817 A2 | 7/2009 | | |
| WO | WO-2017069702 A1 * | 4/2017 | ............ | A01N 43/50 |
| WO | WO-2017078609 A1 * | 5/2017 | ............ | B01J 20/226 |

OTHER PUBLICATIONS

J. Zhou, et al. "Versatile Core-Shell Nanoparticle@Metal-Organic Framework Nanohybrids: Exploiting Mussel-Inspired Polydopamine for Tailored Structural Integration", ACS Nano, 9(7): p. 6951-6960, June (Year: 2015).*

Y. Tu, et al. ("Study of the property of methylene blue while it is used as an electron transfer mediator in enzyme electrode", Fenxi Kexue Xuebao, 13(3): Abstract only (Year: 1997).*

M. Jian, et al. "Water-based synthesis of zeolitic imidazolate framework-8 with high morphology level at room temperature", RSC Advances, 5(60): p. 48433-48441 (Year: 2015).*

Sep. 27, 2017 Written Opinion issued in International Patent Application No. PCT/CN2017/093150.

Sep. 27, 2017 Search Report issued in International Patent Application No. PCT/CN2017/093150.

* cited by examiner

PREPARATION METHOD BASED ON SIMULTANEOUS PACKAGE OF TARGET SUBSTANCE AND SYNTHESIS OF MOFS WITH REDOX ACTIVITY

FIELD OF THE INVENTION

The present invention belongs to the field of synthesis technology, and specifically relates to a preparation method based on simultaneous package of a target substance and synthesis of MOFs with redox activity.

BACKGROUND OF THE INVENTION

A metal-organic frameworks (MOFs) material is a supramolecular crystalline material with nano-pores that is formed by connecting metal ions (clusters) with organic bridging ligands. The MOFs material has many outstanding features: a large specific surface area, an adjustable and controllable pore size and topology and good thermal stability and chemical stability, therefore, the MOFs material has a broader prospect of development than other materials. Due to the adjustable and controllable pore size and topological structure, the MOFs material has a broad application prospect in biological and chemical sensing. In addition, many researches have been made on the application of the MOFs material in catalysts, gas storage, adsorption and separation, drug sustained release and other aspects.

Because the electrochemical sensing technology has the advantages of high sensitivity, environmental protection, fast detection, easy operation and the like, so that the application range is very wide. Using the MOFs material for constructing an electrochemical sensor can further improve the detection sensitivity and the specificity of the electrochemical sensor and improve the analysis accuracy thereof. Target recognition is one of the elements of the sensor, and the MOFs material has natural advantages in sensing. The topological structure of the MOFs material, the choice of node metal ions, the size and shape of a linker organic ligand, the composition of the framework and other factors will affect the pore structures and the pore sizes of the MOFs. The qualitative selection of the required substance is achieved by using the pore structures and the pore sizes, which a very important property of the MOFs and is also one of the most attractive features for applying the MOFs material to sensing. The atoms or molecules that are smaller than the pore structures of the MOFs can be adsorbed into the pores for detection, and the structures and groups in the pores can interact with the target substance (e.g., electrostatic interaction, hydrogen bonds, $\pi$-$\pi$, covalent bonds or the like) so as to further improve the selectivity. Based on the unique pore structure and the large specific surface area of the MOFs material mentioned above, the MOFs can efficiently adsorb and enrich the target substance due to these characteristics, thereby improving the detection sensitivity.

Although most MOFs materials do not have electrical conductivity, their unique pore structures and chemical adjustability make the MOFs materials have a very broad application prospect in the field of electrochemical sensing. By changing organic ligands or metal ions or directly introducing a substance with redox activity into the MOFs material to prepare a novel MOFs material with redox activity, good electrical conductivity and a stable pore structure, and an MOFs thin film electrochemical sensing interface and a sensor device are constructed by physical deposition, self-assembly, electrodeposition and other methods. The configuration, the pore structure, biomolecule recognition on the interface, enrichment and electrochemical signal transduction and other scientific problems of the sensing surface of the MOFs material with redox activity and good electrical conductivity are researched, so that the selectivity of the electrochemical sensor is improved, the detection limit is reduced, and the detection range is broadened; and a biological interface having biological recognition and biological enzyme catalytic functions on a substrate is constructed by using its biocompatibility so as to research the electronic redox transfer basic behaviors of the biomolecules involved in a biosensor on the interface.

However, in the existing method, a redox active substance is introduced into the metal-organic frameworks in a dipping manner, the MOFs need to be synthesized at first, and then the target substance is dissolved in an organic solvent to modify the MOFs by the target substance via covalent bonds. The drawbacks of this method are as follows: 1. the experimental process is complicated and costly, and a large amount of wastes are generated. 2. the pore size of the MOFs in this method is small and fixed, making it difficult to package the target substance of macromolecules, such that the target substance gathers on the surface of the MOFs material, thereby reducing the loading amount of the target substance; and 3. the electric power loading capacity of the target substance in the MOFs material is reduced.

SUMMARY OF THE INVENTION

One objective of the present invention is to overcome the drawback that a MOFs material does not have electrical conductivity in the prior art and to provide a preparation method based on simultaneous package of a target substance and synthesis of MOFs with redox activity.

Another objective of the present invention is to provide a metal-organic framework composite material prepared by the above preparation method. The metal-organic framework is ZIF-8 modified by target molecules and has electrical conductivity, and thus the drawback that the metal-organic framework in the prior art does not have electrical conductivity is solved.

A third objective of the present invention is to provide a modified electrode, which is an electrode modified by the above-mentioned MOFs material, and the modified electrode can detect dopamine accurately and sensitively and has better detection sensitivity and accuracy.

A fourth objective of the present invention is to provide a three-electrode system.

A fifth objective of the present invention is to provide an application of the above-mentioned modified electrode in the detection of dopamine.

In order to solve the above technical problems, the technical solution of the present invention is as follows:

A preparation method based on simultaneous package of a target substance and synthesis of MOFs with redox activity includes the following step:

adding a target substance solution and a 2-methylimidazole aqueous solution into a zinc nitrate aqueous solution for reaction to obtain a precipitate as a target product.

Through research, the inventor has found that although most MOFs materials do not have electrical conductivity, their unique pore structures and chemical adjustability make the MOFs materials have a very broad application prospect in the field of electrochemical sensing. By directly introducing a substance with redox activity to prepare a novel MOFs material with redox activity, good electrical conductivity and a stable pore structure, and thus an efficient electrochemical sensor is prepared. Methylene blue, methyl orange or metal nanoparticles are electroactive substances, the ZIF-8 modified by methylene blue, methyl orange or metal nanoparticles is prepared by a one-pot method, the methylene blue, the methyl orange or the metal nanoparticles increase the pore structure of the ZIF-8, thus providing a fast electron transfer channel, so that the MOFs have good electrocatalytic activity and electrical conductivity. The target substance can be diffused through the MOFs pores and come into contact with metal nanoparticles embedded therein and then interact with the metal nanoparticles to cause signal changes so as to guarantee the unique performance structures of the MOFs and provide the electrochemical activity at the same time.

The MOFs have better electrocatalytic ability on the redox reaction of the target substance instead of having better selectivity. The MOFs have low electron conductivity and poor electrocatalytic ability, the target substance with the electrocatalytic activity is packaged in the MOFs to form a composite material, which increases the pore structures of the MOFs, thereby providing a rapid electron transfer channel and improving the electrical conductivity and the electrocatalytic activity of the MOFs composite material.

Preferably, the target substance is methylene blue, methyl orange or metal nanoparticles.

Preferably, a methylene blue solution is added to the zinc nitrate aqueous solution, and then 2-methylimidazole is added after the methylene blue solution and the zinc nitrate aqueous solution are evenly mixed.

Preferably, the molar ratio of the zinc nitrate to the 2-methylimidazole is 1:30-40.

Preferably, the concentration of the zinc nitrate aqueous solution is 0.2-0.3 g/ml.

Preferably, the concentration of the 2-methylimidazole is 0.1-0.3 g/ml.

Preferably, the reaction temperature is 20-30° C., and the reaction time is 10-20 min. Further preferably, the reaction temperature is 25° C. and the reaction time is 10-20 min.

Preferably, the precipitate is dried in vacuum 75-85° C. for 10-14 h after being washed.

By vacuum drying at about 80° C., the structure of the ZIF-8 skeleton is not damaged, but the drying efficiency is also improved, and the drying time is shortened.

Further preferably, the washing liquid used for washing the precipitate is a mixed solution of water and ethanol. In the present invention, the ethanol and water are used as an organic solvent, and the mixed solution of water and ethanol is selected as the washing liquid to ensure that other impurities are not introduced.

Still further preferably, the volume ratio of water to ethanol in the washing liquid is 1:0.8-1.2.

The metal-organic framework composite material prepared by the above-mentioned preparation method includes a metal-organic framework (ZIF-8) and a target substance packaged in the metal-organic framework, and the target substance is methylene blue, methyl orange or metal nanoparticles. The target substance has redox activity and electrical conductivity.

As the MOFs are synthesized based on the one-pot method and the target substance is directly packaged in the MOFs, the following advantages are achieved: 1. the experimental process is quick and convenient and is easy to operate. 2. The target substance is effectively wrapped in the MOFs, so that the pore sizes of the MOFs can be controlled, and the pore sizes of the MOFs are increased. 3. The electrical conductivity of the MOFs material prepared by the method is significantly enhanced.

The ZIF-8 skeleton structure is composed of $ZnN_4$ tetrahedron structure units formed by the connection of metal Zn ions with N atoms in methylimidazole ester, the topological structure is similar to that of sodalite (SOD), each unit cell contains 2 SOD cages, the diameter of the SOD cage is 1.16 nm, each SOD cage is connected by a six-membered ring cage opening consisting of six Zn atoms, and the diameter of the six-membered ring cage opening is 0.34 nm.

A modified electrode modified by the above-mentioned metal-organic framework composite material is provided.

A three-electrode system includes an electrochemical workstation, and an auxiliary electrode, a working electrode and a reference electrode, which are connected to the electrochemical workstation, wherein the working electrode is the above-mentioned modified electrode.

The preparation method of the above-mentioned modified electrode includes the following steps: dispersing the metal-organic framework in water to form dispersion liquid, then dripping the dispersion liquid to the surface of an electrode, and drying to obtain a methylene blue@MOFs modified electrode.

Preferably, the concentration of the metal-organic framework in the dispersion liquid is 0.8-1.2 mg/ml.

An application of the modified electrode in the detection of dopamine, quercetin and rutin is provided.

The beneficial effects of the present invention are as follows:

The methylene blue, the methyl orange and the metal nanoparticles are selected as the target substance, the target substance is packaged in the MOFs when the MOFs are synthesized by using the one-pot method to obtain the ZIF-8 modified by the methylene blue, the methyl orange or the metal nanoparticles so as to overcome the drawbacks that the existing MOFs material does not have the electrical conductivity.

The synthesis method of the invention is simple, rapid and low in cost, and the prepared product can accurately, sensitively, simply and quickly detect substances such as dopamine, quercetin and rutin, and a new development direction is provided for researches in the fields of biological detection and chemical analysis, etc.

DETAILED DESCRIPTION OF THE EMBODIMENTS

The present invention will be illustrated below in detail in combination with the drawings and specific embodiments.

Substance and equipment used in the experiments and origins thereof are as follows:

$Zn(NO_3)_2 \cdot 6H_2O$, analytically pure, purchased from Aladdin;

methylene blue, analytically pure, purchased from Aladdin;

methyl orange, analytically pure, purchased from Aladdin;

quercetin, analytically pure, purchased from Aladdin;

copper nanoparticles purchased from Aladdin;

rutin, analytically pure, purchased from Aladdin;

2-methylimidazole, analytically pure, purchased from Aladdin;

dopamine, analytically pure, purchased from Aladdin;

phosphate, analytically pure, purchased from Sinopharm Chemical Reagent Co., Ltd.; and redistilled water, self-made.

a magnetic stirrer with a model number 78-1), purchased from Danrui Instrument;

a vacuum drying box with a model number EB-71L, purchased from Shanghai ChenHua Instrument Co., Ltd; and an electrochemical workstation with a model number CHI650, purchased from Shanghai ChenHua Instrument Co., Ltd.

Embodiment 1

Figure 1:
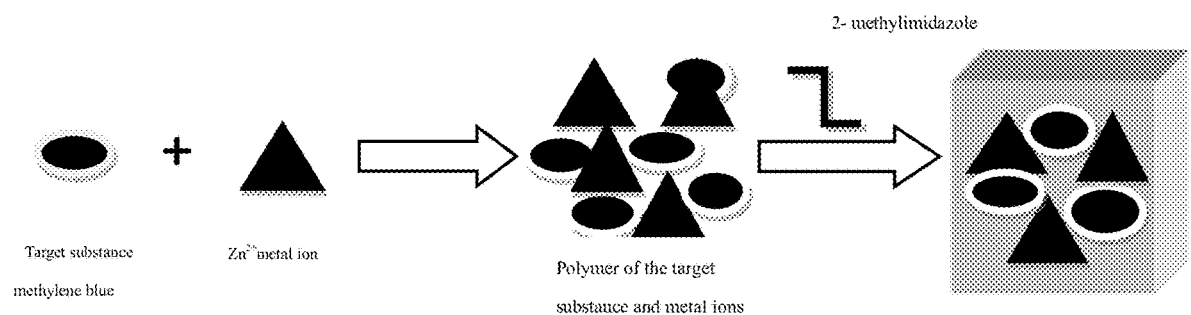
FIG. 1 is a process schematic diagram of a one-pot preparation method based on simultaneous package of a target substance and synthesis of MOFs with redox activity in an embodiment.

Referring to FIG. 1 for the process of a one-pot preparation method based on simultaneous package of a target substance and synthesis of MOFs with redox activity, detailed preparation steps are as follows: firstly, dissolving 0.2 g (0.66 mmol) $Zn(NO_3)_2 \cdot 6H_2O$ in 0.8 g (800 μl) secondary water; preparing 10 mg/ml methylene blue solution by using deionized water, then dripping 4 ml methylene blue stock solution into the $Zn(NO_3)_2$ aqueous solution, and uniformly and vigorously stirring the mixture for one minute, and dripping 10 g solution containing 2 g (24.36 mmol) 2-methylimidazole and 8 g secondary water into the above-mentioned solution; stirring the reaction mixture by a magnetic stirrer for 15 minutes; and collecting a precipitate by centrifugal separation and washing the precipitate by using a mixed solution of water and ethanol (1:1) for at least three times, and then drying the precipitate in a vacuum drying box at 80° C. for 12 hours.

Figure 2:
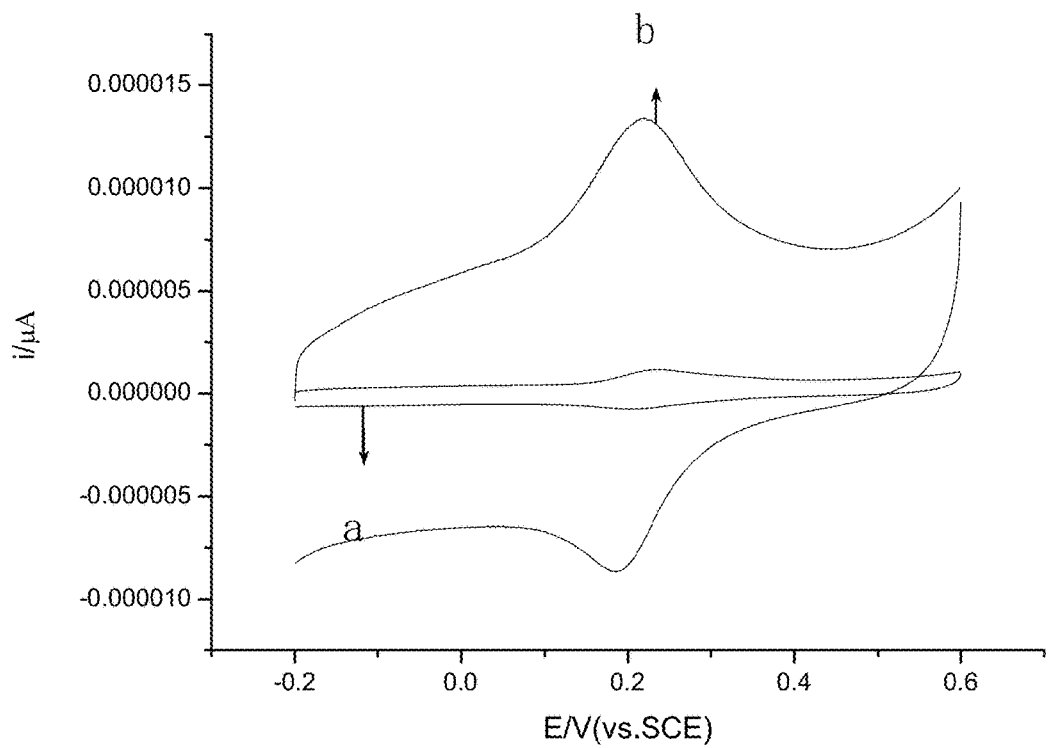
FIG. 2 is a contrast diagram of CV curves of response of dopamine on a bare electrode and on a MOFs modified electrode modified by methylene blue in embodiment 1, wherein a represents the bare electrode and b represents the MOFs modified electrode modified by methylene blue.

Preparation of Nafion/methylene blue@MOFs/GCE: dissolving methylene blue@MOFs in secondary water to form 1 mg/ml dispersion solution, and performing ultrasonic treatment in an ultrasonic cleaner for 2 h to obtain a well-dispersed methylene blue@MOFs solution; dripping 6 μl above-mentioned methylene blue@MOFs dispersion liquid to the surface of the electrode, and drying to obtain a methylene blue@MOFs modified electrode (methylene blue@MOFs/GCE); performing CV detection on dopamine by using the methylene blue@MOFs/GCE and a bare GCE to obtain CV diagrams of the dopamine on a bare electrode (curve a) and the MOFs modified electrode (curve b) modified by methylene blue, observing the CV scanning diagram to obtain that the detection sensitivity and accuracy of the MOFs modified electrode modified by methylene blue are better than those of the bare electrode, as shown in FIG. 2.

A three-electrode system is assembled, and an auxiliary electrode, a reference electrode and a working electrode are connected to an electrochemical workstation, and the working electrode is the methylene blue@MOFs/GCE prepared above. The reference electrode herein may be a saturated calomel electrode, an Ag/AgCl electrode or a standard hydrogen electrode (SHE or NHE). The auxiliary electrode is a platinum black electrode or a metal material that is inert in the medium, such as Ag, Ni, W, Pb or the like.

In the following experiment, the auxiliary electrode of the three-electrode system is the platinum black electrode and the reference electrode is the saturated calomel electrode.

Figure 3:
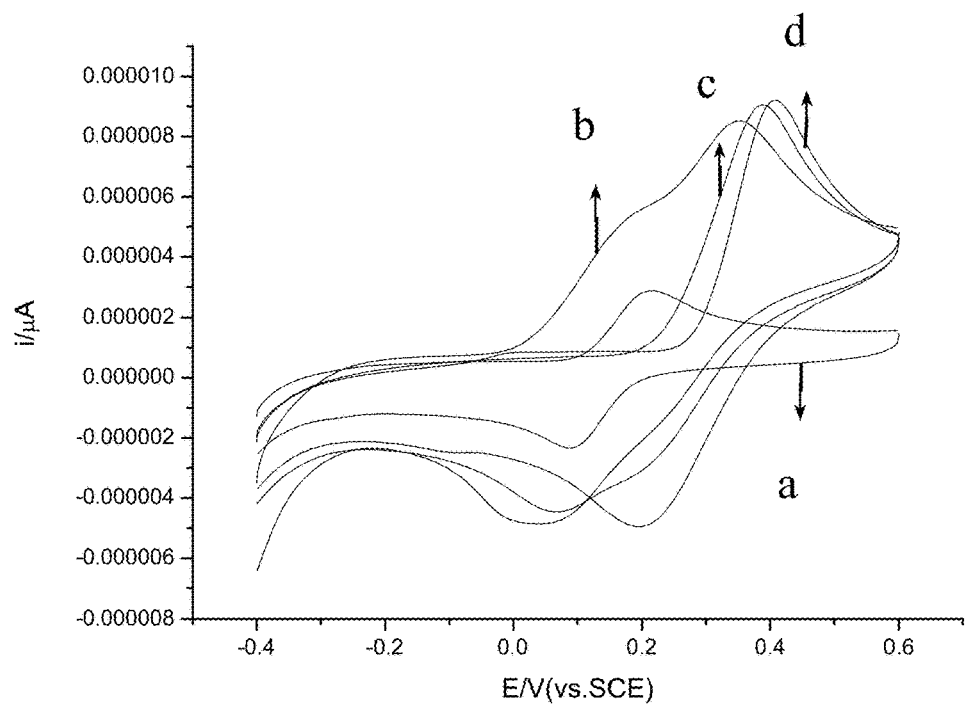
FIG. 3 is a response cyclic voltammetry curve of dopamine in different pH values in embodiment 1, wherein a represents pH=7, b represents pH=8, c represents pH=6, and d represents pH=5.

PBS buffer solutions with pH of 5, 6, 7 and 8 are prepared respectively, then dopamine of a determined mass (0.0019 g) is dissolved in the PBS solutions (the PBS solutions herein are all phosphate buffer solutions) with different pH, and then the solutions are transferred into a 100 ml volumetric flask for constant volume. The three-electrode system is inserted into the PBS buffer solutions with different pH and is scanned at a speed of 200 mv/s, a scanning voltage interval is set as –0.2-0.6V, and it can be obtained by observing the scanning graph that when the pH is 5-6, the shape data of the obtained voltammetric cycle graph is the best, as shown in FIG. 3, in which a represents pH=7, b represents pH=8, c represents pH=6, and d represents pH=5.

Figure 4:
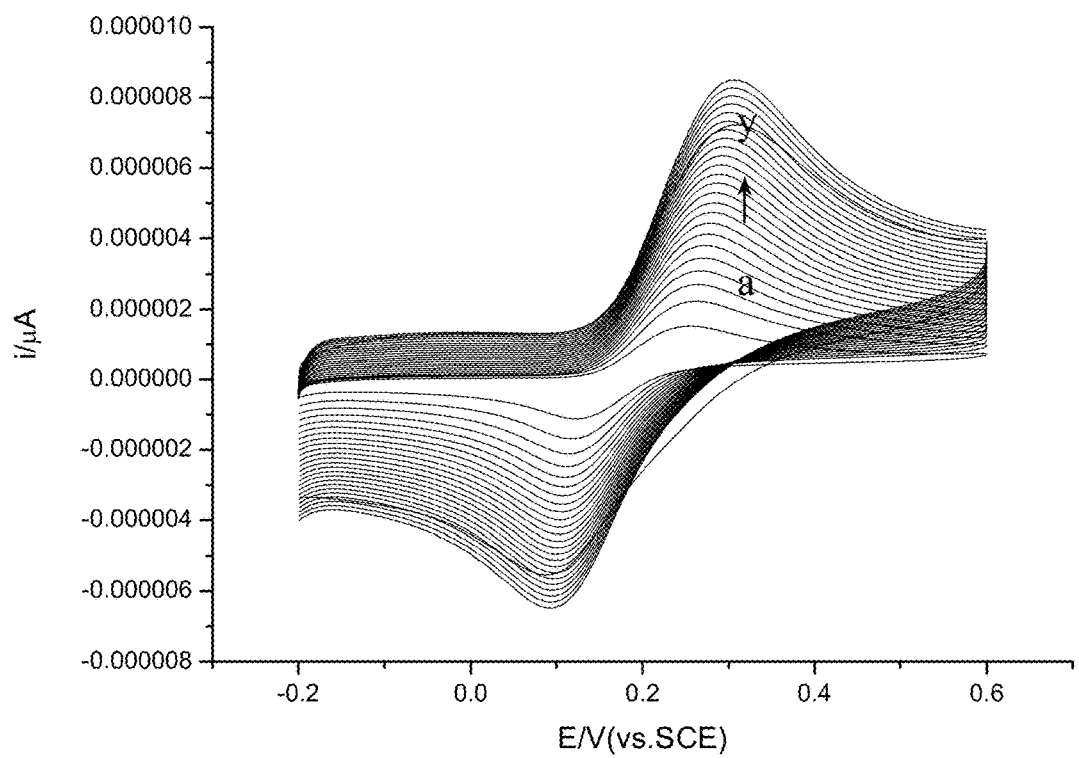
FIG. 4 is a cyclic voltammetry curve of dopamine at different scanning speeds in embodiment 1, wherein a to y are sequentially located from bottom to top along an arrow direction, and a to y sequentially indicate the CV curves of the dopamine at the scanning speeds of 10 mv, 20 mv, 30 mv, 40 mv, 50 mv, 60 mv, 70 mv, 80 mv, 90 mv, 100 mv, 110 mv, 120 mv, 130 mv, 140 mv, 150 mv, 160 mv, 170 mv, 180 mv, 190 mv, 200 mv, 210 mv, 220 mv, 230 mv, 240 mv and 250 mv.

A PBS buffer solution with pH of 5.68 is prepared, then dopamine with determined mass (0.0019 g) is dissolved in PBS, and then the solution is transferred into a 100 ml volumetric flask for constant volume. The three-electrode system is inserted into the PBS buffer solution and is scanned at different scanning speeds, a scanning voltage interval is set as –0.2-0.6V, and it can be obtained by observing the figure that when the scanning speed is 200 mv/s, the shape data of the obtained voltammetric cycle graph is the best, as shown in FIG. 4, in which the scanning voltages are sequentially as follows along the arrow direction: 10 mv, 20 mv, 30 mv, 40 mv, 50 mv, 60 mv, 70 mv, 80 mv, 90 mv, 100 mv, 110 mv, 120 mv, 130 mv, 140 mv, 150 mv, 160 mv, 170 mv, 180 mv, 190 mv, 200 mv, 210 mv, 220 mv, 230 mv, 240 mv and 250 mv.

Figure 5:
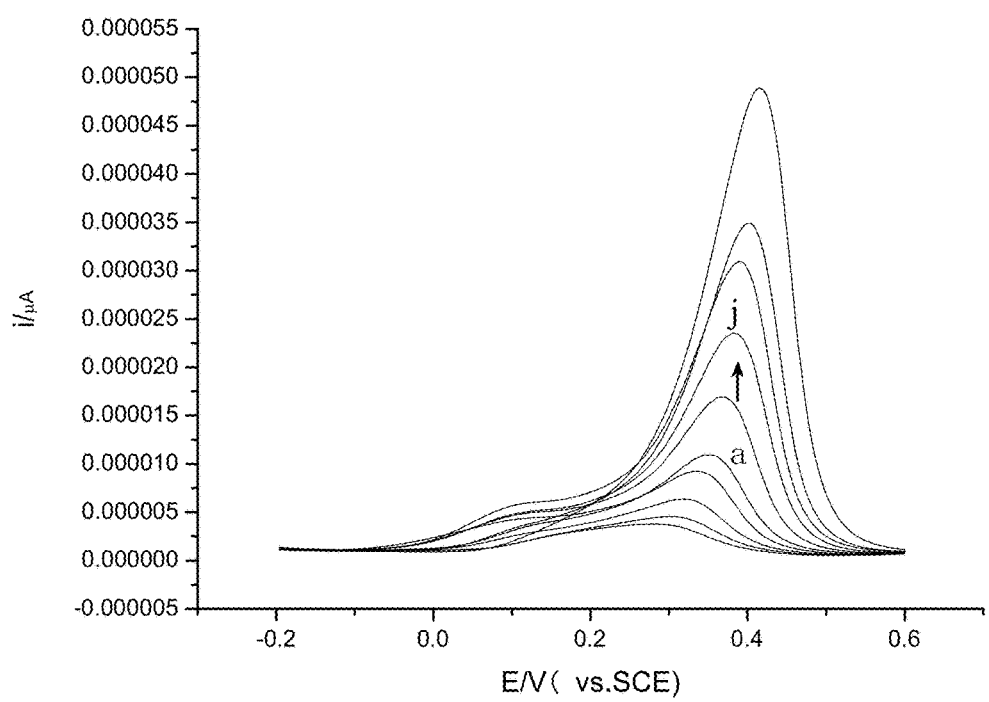
FIG. 5 is a cyclic voltammetry curve of a ZIF-8 modified electrode modified by methylene blue in a DA solution with different concentrations in embodiment 1, wherein a to j are sequentially located from bottom to top along an arrow direction, and a to j sequentially indicate the concentrations of the DA solutions: $1\times10^{-8}$ mol/L, $1\times10^{-7}$ mol/L, $5\times10^{-7}$ mol/L, $1\times10^{-6}$ mol/L, $5\times10^{-6}$ mol/L, $1\times10^{-5}$ mol/L, $5\times10^{-5}$ mol/L, $1\times10^{-4}$ mol/L and $1\times10^{-3}$ mol/L.

A PBS solution with pH of 5.68 is prepared, $1\times10^{-4}$ mol DA (dopamine) is weighed and dissolved in the PBS and is transferred into a 100 ml volumetric flask to prepare a $1\times10^{-3}$ mol/L solution, and 25 ml solution is taken from the volumetric flask and is diluted by the PBS in the 100 ml volumetric flask to prepare a $5\times10^{-4}$ mol/L solution. According to the above-mentioned method, $1\times10^{-3}$ mol/L, $1\times10^{-4}$ mol/L, $5\times10^{-5}$ mol/L, $1\times10^{-5}$ mol/L, $5\times10^{-6}$ mol/L, $1\times10^{-6}$ mol/L, $5\times10^{-7}$ mol/L, $1\times10^{-7}$ mol/L and $1\times10^{-8}$ mol/L DA solutions are prepared in sequence, the scanning speed is set as 200 mv/s, the scanning voltage interval is set as –0.2-0.6 v, then voltammetry curves are respectively tested as shown in FIG. 5, in which the concentrations of the DA solutions corresponding to the voltammetry curves from top to bottom are $5\times10^{-4}$ mol/L, $1\times10^{-4}$ mol/L, $1\times10^{-3}$ mol/L, $5\times10^{-5}$ mol/L, $1\times10^{-5}$ mol/L, $5\times10^{-6}$ mol/L, $1\times10^{-6}$ mol/L, $5\times10^{-7}$ mol/L, $1\times10^{-7}$ mol/L and $1\times10^{-8}$. It can be seen from FIG.

5 that with the increase of the concentration, the response current increases successively.

Embodiment 2

Referring to FIG. 1 for the process of a one-pot preparation method based on simultaneous package of a target substance and synthesis of MOFs with redox activity, the detailed preparation steps are as follows: firstly, dissolving 0.2 g (0.66 mmol) $Zn(NO_3)_2 \cdot 6H_2O$ in 0.8 g (800 μl) secondary water; preparing 10 mg/ml methyl orange solution by using deionized water, then dripping 4 ml methyl orange stock solution into the $Zn(NO_3)_2$ aqueous solution, and uniformly and vigorously stirring the mixture for one minute, and dripping 10 g solution containing 2 g (24.36 mmol) 2-methylimidazole and 8 g secondary water into the above-mentioned solution; stirring a reaction mixture by a magnetic stirrer for 15 minutes; and collecting a precipitate by centrifugal separation and washing the precipitate by using a mixed solution of water and ethanol (1:1) for at least three times, and then drying the precipitate in a vacuum drying box at 80° C. for 12 hours.

Preparation of Nafion/methyl orange@MOFs/GCE: dissolving methyl orange@MOFs in secondary water to form 1 mg/ml dispersion solution, and performing ultrasonic treatment in an ultrasonic cleaner for 2 h to obtain a well-dispersed methyl orange@MOFs solution; dripping 6 μl methyl orange@MOFs dispersion liquid to the surface of the electrode, and drying to obtain a methyl orange@MOFs modified electrode (methyl orange@MOFs/GCE).

The methyl orange@MOFs modified electrode can be used for detecting quercetin.

A three-electrode system is assembled, and an auxiliary electrode, a reference electrode and a working electrode are connected to an electrochemical workstation, and the working electrode is the methyl orange@MOFs/GCE prepared above. The reference electrode herein may be a saturated calomel electrode, an Ag/AgCl electrode or a standard hydrogen electrode (SHE or NHE). The auxiliary electrode is a platinum black electrode or a metal material that is inert in the medium, such as Ag, Ni, W, Pb or the like.

In the following experiment, the auxiliary electrode of the three-electrode system is the platinum black electrode and the reference electrode is the saturated calomel electrode.

PBS buffer solutions with pH of 5, 6, 7 and 8 are prepared respectively, then quercetin of a determined mass (0.0038 g) is dissolved in the PBS solutions (the PBS solutions herein are all phosphate buffer solutions) with different pH, and then the solutions are transferred into a 100 ml volumetric flask for constant volume. The three-electrode system is inserted into the PBS buffer solutions with different pH and is scanned at a speed of 200 mv/s, a scanning voltage interval is set as −0.2-0.6V, and it can be obtained by observing the scanning graph that when the pH is 5, the shape data of the obtained voltammetric cycle graph is the best.

A PBS buffer solution with pH of 5 is prepared, then the quercetin with determined mass (0.0038 g) is dissolved in PBS, and then the solution is transferred into a 100 ml volumetric flask for constant volume. The three-electrode system is inserted into the PBS buffer solution and is scanned at different scanning speeds, a scanning voltage interval is set as −0.2-0.6V, and when the scanning speed is 200 mv/s, the shape data of the obtained voltammetric cycle graph is the best.

A PBS solution with pH of 5 is prepared, $1\times10^4$ mol quercetin is weighed and dissolved in the PBS and is transferred into a 100 ml volumetric flask to prepare a $1\times10^{-3}$ mol/L solution, and 25 ml solution is taken from the volumetric flask and is diluted by the PBS in the 100 ml volumetric flask to prepare a $5\times10^4$ mol/L solution. According to the above-mentioned method, $1\times10^{-3}$ mol/L, $1\times10^4$ mol/L, $5\times10^{-5}$ mol/L, $1\times10^{-5}$ mol/L, $5\times10^{-6}$ mol/L, $1\times10^{-6}$ mol/L, $5\times10^{-7}$ mol/L, $1\times10^{-7}$ mol/L and $1\times10^{-8}$ mol/L DA solutions are prepared in sequence, the scanning speed is set as 200 mv/s, the scanning voltage interval is set as −0.2-0.6 v, and then voltammetry curves are respectively tested.

Embodiment 3

Referring to FIG. 1 for the process of a one-pot preparation method based on simultaneous package of a target substance and synthesis of MOFs with redox activity, the detailed preparation steps are as follows: firstly, dissolving 0.2 g (0.66 mmol) $Zn(NO_3)_2 \cdot 6H_2O$ in 0.8 g (800 μl) secondary water; preparing 10 mg/ml copper nanoparticle suspension by using deionized water, then dripping 4 ml copper nanoparticle suspension into the $Zn(NO_3)_2$ aqueous solution, and uniformly and vigorously stirring the mixture for one minute, and dripping 10 g solution containing 2 g (24.36 mmol) 2-methylimidazole and 8 g secondary water into the above-mentioned solution; stirring a reaction mixture in a magnetic stirrer for 15 minutes; and collecting a precipitate by centrifugal separation and washing the precipitate by using a mixed solution of water and ethanol (1:1) for at least three times, and then drying the precipitate in a vacuum drying box at 80° C. for 12 hours.

Preparation of Nafion/metal nanoparticle@MOFs/GCE: dissolving metal nanoparticle@MOFs in secondary water to form 1 mg/ml dispersion solution, and performing ultrasonic treatment in an ultrasonic cleaner for 2 h to obtain a well-dispersed metal nanoparticle@MOFs solution; dripping 6 μl metal nanoparticle@MOFs dispersion liquid to the surface of the electrode, and drying to obtain a metal nanoparticle@MOFs modified electrode (metal nanoparticle@MOFs/GCE).

The metal nanoparticle@MOFs modified electrode can be used for detecting rutin.

A three-electrode system is assembled, and an auxiliary electrode, a reference electrode and a working electrode are connected to an electrochemical workstation, and the working electrode is the metal nanoparticle@MOFs/GCE prepared above. The reference electrode herein may be a saturated calomel electrode, an Ag/AgCl electrode or a standard hydrogen electrode (SHE or NHE). The auxiliary electrode is a platinum black electrode or a metal material that is inert in the medium, such as Ag, Ni, W, Pb or the like.

In the following experiment, the auxiliary electrode of the three-electrode system is the platinum black electrode and the reference electrode is the saturated calomel electrode.

PBS buffer solutions with pH of 6, 7, 8 and 9 are prepared respectively, then rutin with determined mass (0.0075 g) is dissolved in the PBS solutions (the PBS solutions herein are phosphate buffer solutions) with different pH, and then the solutions are transferred into a 100 ml volumetric flask for constant volume. The three-electrode system is inserted into the PBS buffer solutions with different pHs and is scanned at a speed of 200 mv/s, a scanning voltage interval is set as −0.2-0.6V, and when the pH is 8, the shape data of the obtained voltammetric cycle graph is the best.

A PBS buffer solution with pH of 8 is prepared, then the rutin with determined mass (0.0075 g) is dissolved in PBS, and then the solution is transferred into a 100 ml volumetric flask for constant volume. The three-electrode system is inserted into the PBS buffer solution and is scanned at different scanning speeds, a scanning voltage interval is set as −0.2-0.6V, and when the scanning speed is 200 mv/s, the shape data of the obtained voltammetric cycle graph is the best.

A PBS solution with pH of 8 is prepared, $1\times10^{-4}$ mol rutin is weighed and dissolved in the PBS and is transferred into a 100 ml volumetric flask to prepare a $1\times10^{-3}$ mol/L solution, and 25 ml solution is taken from the volumetric flask and is diluted by the PBS in the 100 ml volumetric flask to prepare a $5\times10^{-4}$ mol/L solution. According to the above-mentioned method, $1\times10^{-3}$ mol/L, $1\times10^{-4}$ mol/L, $5\times10^{-5}$ mol/L, $1\times10^{-5}$ mol/L, $5\times10^{-6}$ mol/L, $1\times10^{-6}$ mol/L, $5\times10^{-7}$ mol/L, $1\times10^{-7}$ mol/L and $1\times10^{-8}$ mol/L DA solutions are prepared in sequence, the scanning speed is set as 200 mv/s, the scanning voltage interval is set as −0.2-0.6 v, and then voltammetry curves are respectively tested.

Although specific embodiments of the present invention have been described above with reference to the drawings, the protection scope of the present invention is not limited hereto. Those skilled in the pertinent field should understand that, based on the technical solutions of the present invention, various modifications or variations made by those skilled in the art without any creative work are still encompassed within the protection scope of the present invention.

The invention claimed is:

1. A preparation method of a modified electrode, the method comprising:
dispersing a metal-organic framework composite material in water to form a dispersion liquid, the metal-organic framework composite material having been prepared by adding a methylene blue solution and then a 2-methylimidazole aqueous solution into a zinc nitrate aqueous solution for reaction to obtain a precipitate as a target product, wherein the 2-methylimidazole aqueous solution is added to the zinc nitrate aqueous solution after the methylene blue solution and the zinc nitrate aqueous solution are evenly mixed;
dripping the dispersion liquid onto the surface of an electrode; and then
drying to obtain a methylene blue @ MOFs modified electrode.

* * * * *